United States Patent

[11] 3,616,368

| [72] | Inventors | Isao Ishigaki<br>Takasaki-shi;<br>Akihiko Ito, Takasaki-shi; Tadashi Iwai,<br>Miura-Gun, all of Japan |
|---|---|---|
| [21] | Appl. No. | 822,721 |
| [22] | Filed | May 7, 1969 |
| [45] | Patented | Oct. 26, 1971 |
| [73] | Assignee | Japan Atomic Energy Research Institute |
| [32] | Priority | May 20, 1968 |
| [33] | | Japan |
| [31] | | 43/33869 |

[54] METHOD FOR THE RADIATION POLYMERIZATION OF POLYOXYMETHYLENE
10 Claims, No Drawings

[52] U.S. Cl. .................................................. 204/159.21,
260/67
[51] Int. Cl. ........................................... C08f 3/40,
C08d 1/00, C08f 1/16
[50] Field of Search .......................................... 204/159.21;
260/67 PR

[56] References Cited
UNITED STATES PATENTS
3,242,063  3/1966  Okamura et al. ............. 204/159.21

Primary Examiner—Samuel H. Blech
Assistant Examiner—Richard B. Tuver
Attorneys—Harry C. Bierman, Jordan B. Bierman and Bierman & Bierman ABSTRACT: Polyoxymethylenes are obtained by first irradiating trioxane and/or tetraoxane with ionizing radiation, then contacting the irradiated trioxane and/or tetraoxane with nonirradiated trioxane and/or tetraoxane, and then maintaining the resulted mixture under the polymerizing condition to thereby effect polymerization of the whole system including the nonirradiated trioxane and/or tetraoxane by the action of active species formed in the irradiated trioxane and/or tetraoxane to give polyoxymethylenes readily with a minimum dosage required for such irradiation.

METHOD FOR THE RADIATION POLYMERIZATION OF POLYOXYMETHYLENE

The present invention relates to an improvement in the process for the production of polyoxymethylene by irradiation using ionizing radiation.

It has been known in the art that polyoxymethylenes can be obtained by irradiation polymerization of trioxane or tetraoxane under the action of ionizing radiation. One of the known processes is to cause polymerization simultaneously with irradiation to trioxane or tetraoxane which has previously been kept at a certain temperature just below its melting point. Another known process comprises that the monomer is polymerized after irradiation with ionizing radiation, the process being so-called post-effect polymerization method. In these prior processes, however, the monomer mass to be polymerized must be entirely irradiated with ionizing radiation and, therefore they are not economical when a large bulk of the monomer is treated in industrial scale, because of extremely large irradiating equipment needed and of prolonged time required for such irradiation.

The object of the present invention is to provide a process whereby radiation polymerization of trioxane, tetraoxane or their mixture can be effectively carried out by the use of a relatively small dosage of irradiation.

The above object has now been accomplished by irradiating a cyclic oxymethylene monomer selected from the group consisting of trioxane, tetraoxane and a mixture thereof, with ionizing radiation, bringing thus irradiated cyclic oxymethylene monomer into contact with the nonirradiated cyclic oxymethylene monomer, then heating the contacted mixture at the polymerizing temperature of said oxymethylene monomer to thereby effect polymerization.

During the course of our research on the irradiation polymerization process of the oxymethylene monomer, we, the inventors have now discovered that when trioxane or tetraoxane is irradiated in the solid state with ionizing radiation and then condensed by sublimation in another vessel at a reduced pressure below 1 mm. Hg, the active species which have already been formed in the irradiated monomer are, unexpectedly, not lost by the sublimating and condensing actions and still sufficiently active. As a result of further elaborated studies, we have become aware of the capability of obtaining polyoxymethylene in economical and efficient ways by bringing the irradiated monomer into contact with the nonirradiated monomer and heating the resulted mixture to a conventional polymerization temperature to effect the polymerization of the entirety of the monomers including the nonirradiated monomer.

In accordance with the practice of this invention, a portion of the cyclic oxymethylene monomer selected from the group consisting of trioxane, tetraoxane and a mixture thereof is, first, irradiated with ionizing radiation of, for instance, $\gamma$-ray, $\alpha$-ray, X-ray or electron beams to generate active species therein. This treatment is preferably carried out by irradiating the monomer with such ionizing radiation as of the dosage above $1.0 \times 10^3$ rad, preferably, $1.0 \times 10^5 - 1.0 \times 10^7$ rad, under a low temperature, preferably, below a room temperature.

The process is followed by contact of the irradiated monomer with the nonirradiated monomer. The contact between the both monomers is practically carried out either by mechanically mixing the irradiated monomer with the nonirradiated monomer, or by sublimating the irradiated monomer and condensing the sublimated monomer onto the particle surface of the nonirradiated monomer, or by contacting these irradiated and nonirradiated monomers at their gaseous phases. Since both trioxane and tetraoxane are sublimative substances, it is desirable to employ the method in which the irradiated and/or nonirradiated monomer be sublimated. However, since trioxane and tetraoxane are polymerized at a temperature above 35° C. and 80° C., respectively, the contact between the irradiated and nonirradiated monomers must be carried out at a temperature below their respective polymerization temperatures. It is preferred to maintain the nonirradiated monomer at a temperature as low as possible for the purpose of facilitating sublimation and gasification of the irradiated monomer, because the amount of contact by sublimation becomes greater as the difference in temperatures between both monomers becomes great. Though the contact may be carried out in air, it is desirable to maintain, when distilled trioxane is used as the nonirradiated monomer, the system at a reduced pressure of 1 mm. Hg or below, preferably, $1.0 \times 10^{13}$ mm. Hg. The mixing ratio of the irradiated monomer to the nonirradiated monomer can be suitably determined depending upon the dosage of irradiation applied to the starting trioxane and/or tetraoxane, the method of contact between both monomers and other reaction conditions. Duration of such contact is also determined depending upon the method of contact, pressure of the contact system, the difference in temperature between the irradiated and nonirradiated monomers, the mixing ratio of the both monomers, shapes and surface areas of these monomers particles, etc., but it gives little influence to the successive polymerization.

The process of this invention is then followed by the step of heating the contact mixture of irradiated and nonirradiated monomers up to a polymerization temperature to thereby produce polyoxymethylene. This polymerization may be carried out either in air or in vacuo at a temperature below the melting point of the monomers, particularly in the range where radiation post-polymerization takes place. When the monomer used is a mixture of trioxane and tetraoxane, the melting point of the mixture varies depending upon the mixing ratio of trioxane and tetraoxane. The practical polymerization temperature ranges at various monomer mixing ratios will be given in a table below:

| Mixing Molar Ratio<br>Trioxane : Tetraoxane) | Melting Point (°C.) | Polymerization Temperature Range (°C.) |
| --- | --- | --- |
| 10:0 | 64 | 34–64 |
| 9:1 | 60 | 34–60 |
| 7:3 | 56 | 3–56 |
| 5:5 | 55 | 30–55 |
| 3:7 | 104 | 75–104 |
| 1:9 | 111 | 80–111 |
| 0:10 | 114 | 80–114 |

The trioxane or tetraoxane to be used as monomer in the process of this invention is not so particularly limitive in its properties, but may have the purity to the extent of being suitable for use in the conventional production of polyoxymethylene. However, since the process of this invention involves the utilization of the active species formed in the irradiated monomer, the nonirradiated monomer should preferably have as large crystalline surface area as possible so that the contact of the nonirradiated monomer with the active species formed in the irradiated monomer may be as much as possible, whereby to readily obtain polyoxymethylene in high yields.

The process of this invention will be explained in more details by the following examples, but the scope of this invention should in no way be limited thereto.

EXAMPLE 1

A hard-glass ampul was charged with 0.2 g. of trioxane and sealed by fusing at a reduced pressure, then irradiated with $\gamma$-ray from cobalt 60 at the dosage of $1.0 \times 10^7$ rad under cooling to $-78°$ C.

The above ampul was then connected with a glass reactor tube containing 2.0 g. of the nonirradiated trioxane previously purified by sublimation and condensation under the reduced pressure of $1.0 \times 10^{16}$ mm. Hg, then the reactor tube was cooled to a liquid nitrogen temperature to have 0.15 g. of said irradiated trioxane sublimed and condensed onto the surface of said nonirradiated trioxane contained therein. After sealing by fusing the reactor tube, it was immersed in a constant-temperature bath kept at 45° C. for 48 hours to effect the polymerization of trioxane.

After the completion of the reaction, the reactor tube was unsealed, the content washed with methanol and unreacted trioxane separated by filtration and dried in vacuo to give polyoxymethylene with the polymer yield of 50.2 percent having the intrinsic viscosity $[\eta]$ of 3.6 dl./g. (measured at 60° C. in the solution in parachlorophenol containing 2 percent of $\alpha$-pinene. Hereinafter, this measuring condition is applicable to other examples).

EXAMPLE 2

The same procedure as example 1 was repeated except that trioxane used was 0.15 g. and it was irradiated at the dosage of $1.0 \times 10^6$ rad and contacted with 1.5 g. of nonirradiated trioxane. Polyoxymethylene was thus obtained with the yield of 67.0 percent and the intrinsic viscosity of 4.6 dl./g. Accordingly, the entire amount of trioxane used (1.65 g.) was polymerized into polyoxymethylene with the dosage of $1.0 \times 10^6$ rad which corresponds to the total monomer dosage of approximately $9 \times 10^4$ rad.

For the purpose of comparison, 1.5 g. of nonirradiated trioxane sublimed and condensed in the same manner as shown above was irradiated with $\gamma$-ray of the dosage of $9 \times 10^4$ rad and polymerized at 45° C. for 48 hours. The yield of polymer formed was only as low as 26.7 percent and the intrinsic viscosity thereof was 3.7 dl./g.

In another comparative test, similarly sublimed and condensed nonirradiated trioxane was polymerized, not by contact with the irradiated trioxane, at 45° C. for 48 hours to give the polymer yield of as low as 5.48 percent.

EXAMPLE 3

In a glass reactor, there was charged 2.0 g. of granular trioxane purified by distillation and onto its surface 0.15 g. of trioxane which had been irradiated with $\gamma$-ray at the dosage of $1.0 \times 10^7$ rad was sublimed and condensed according to the same manner as example 1. Upon polymerization at 45° C. for 48 hours, polyoxymethylene was obtained with the intrinsic viscosity of $[\eta]=1.4$ dl./g. and the polymer yield of 9.17 percent. In a comparative test, it was found that the granular trioxane was heated at 45° C. for 48 hours, not by contact with the irradiated trioxane, resulting in the polymer yield decreasing to only 0.893 percent.

EXAMPLE 4

As in example 1, trioxane was irradiated with $\gamma$-ray, then the ampul was connected with the reactor tube and thereafter the gaseous phases of the ampul and the reactor tube were brought into communication with each other by breaking the break seal between them. After immersing this for 48 hours in a constant-temperature bath kept at 45° C., polyoxymethylene having the intrinsic viscosity of $[\eta]=3.0$ dl./g. was obtained with the polymer yield of 52.8 percent.

EXAMPLE 5

The procedure of preceding example was repeated by contacting a gaseous phase portion of 2.0 g. of nonirradiated trioxane sublimed and condensed with 0.2 g. of trioxane previously irradiated with $\gamma$-ray at the dosage of $1.0 \times 10^6$ rad. After polymerizing at 45° C. for 48 hours, polyoxymethylene having the intrinsic viscosity of $[\eta]=4.8$ dl./g. was obtained with the polymer yield of 49.9 percent.

EXAMPLE 6

According to the same manner as example 4, 2.0 g. of granular trioxane purified by distillation was contacted with 0.2 g. of trioxane irradiated with $\gamma$-ray at the dosage of $1.0 \times 10^7$ rad and polymerized similarly to give polyoxymethylene having the intrinsic viscosity of $[\eta]=1.4$ dl./g. and the polymer yield of 7.37 percent.

EXAMPLE 7

0.15 g. of trioxane purified by distillation and collected in a glass ampul was irradiated with $\gamma$-ray at the dosage of $1.0 \times 10^6$ rad. This was then taken into a reactor tube together with 2.0 g. of trioxane purified by sublimation. The content of the tube, in air, was cooled to $-78°$ C., sealed by fusing the tube under the reduced pressure of $1 \times 10^{13}$ mm. Hg, then kept at 45° C. for 48 hours. Thus polyoxymethylene was obtained with the intrinsic viscosity of $[\eta]=3.1$ dl./g. and the polymer yield of 52.3 percent. For comparison, the sublimation-purified trioxane was temporarily contacted with air, but not contacted with the irradiated trioxane, and thereafter the tube sealed by fusing under the reduced pressure of $1 \times 10^{13}$ at 45° C. for 48 hours. Thus, polymerization occurred with the polymer yield of only 1.27 percent.

EXAMPLE 8

A stainless steel vessel fitted with a valved side tube and a heat-cooling jacket and capable of evacuating at a pressure below $1 \times 10^{12}$ mm. Hg was charged with 2.3 kg. of trioxane purified by sublimation. Then the content was cooled to $-50°$ C. and evacuated to a reduced pressure. Through the side tube, 250 g. of another trioxane previously irradiated with $\gamma$-ray at the dosage of $10 \times 10^7$ rad was introduced into the vessel, and sublimed and condensed onto the previously charged trioxane.

The content was thereafter heated by passing warm water through the jacket to the temperature of 50° C. to effect polymerization of trioxane for 5 hours. After completion of the reaction, the content was washed with methanol and the polymer formed was filtered and dried in vacuo to give polyoxymethylene having the intrinsic viscosity of $[\eta]=2.3$ dl./g. and the polymer yield of 42.7 percent.

EXAMPLE 9

A glass reactor tube same as that used in example 1 was charged with 2.0 g. of tetraoxane, while 0.15 g. of trioxane put in a glass ampul was irradiated with $\gamma$-ray at the dosage of $1.0 \times 10^6$ rad in a manner similar to example 1.

After connecting the ampul with the reactor tube, the irradiated trioxane was condensed by sublimation onto the surface of tetraoxane in a manner similar to example 1, then the reactor tube was immersed for 2 hours in a constant-temperature bath kept at 105° C. to give polyoxymethylene having the intrinsic viscosity of $[\eta]=1.2$ dl./g. and the polymer yield of 76.9 percent. Whereas, the polymer yield was only 4.36 percent when tetraoxane was polymerized at 105° C. for 2 hours out of contact with the irradiated trioxane.

EXAMPLE 10

According to the manner same as in example 4, 0.5 g. of trioxane irradiated with $\gamma$-ray at the dosage of $1.0 \times 10^6$ rad was contacted in gaseous phase with 2.0 g. of nonirradiated tetraoxane. Then, the contents was immersed for 2 hours in a constant temperature bath kept at 105° C. to give polyoxymethylene having the intrinsic viscosity $[\eta]=1.3$ dl./g. and the polymer yield of 90.1 percent.

EXAMPLE 11

A reactor tube shown in example 1 was charged with 2.0 g. of trioxane sublimed and condensed, onto which 0.2 g. of tetraoxane previously irradiated with $\gamma$-ray at the dosage of $1.0 \times 10^6$ rad was condensed by sublimation. After immersing the tube in a constant-temperature bath kept at 45° C. for 48 hours, polyoxymethylene having the intrinsic viscosity of $[\eta]=1.8$ dl./g. was obtained with the polymer yield of 39.2 percent.

EXAMPLE 12

According to the same manner as example 4, 0.2 g. of tetraoxane irradiated with γ-ray of the dosage of $1.0\times10^6$ rad was contacted in gaseous phase with 2.0 g. of nonirradiated trioxane and immersed in a constant-temperature water bath kept at 45° C. for 48 hours to effect polymerization. There was obtained polyoxymethylene having the intrinsic viscosity of $[\eta]=2.3$ dl./g. and the polymer yield of 31.8 percent.

EXAMPLE 13

According to the manner same as example 1, nonirradiated tetraoxane put in a reactor tube was contacted with another tetraoxane previously irradiated with γ-ray at the dosage of $1.0\times10^6$ rad, and heated at 105° C. for 2 hours for effecting polymerization. There was obtained polyoxymethylene having the intrinsic viscosity of $[\eta]=1.3$ dl./g. and the polymer yield of 83.2 percent.

EXAMPLE 14

According to the manner same as in example 4, 0.2 g. of tetraoxane irradiated with γ-ray of the dosage of $1.0\times10^6$ rad was contacted in gaseous phase with nonirradiated 2.0 g. of tetraoxane, and heated for 2 hours at 105° C. to give polyoxymethylene having the intrinsic viscosity $[\eta]=1.4$ dl./g. and the polymer yield of 79.8 percent.

EXAMPLE 15

According to the same manner as in example 4, into a glass ampul were charged 0.1 g. of trioxane and 0.1 g. of tetraoxane, and irradiated with γ-ray at the dosage of $1.0\times10^6$ rad. The ampule was then connected with a reactor tube containing 2.0 g. of trioxane purified by sublimation, creating communication between their gaseous phases. After maintaining the reactor tube at 45° C. for 48 hours, polyoxymethylene having the intrinsic viscosity of $[\eta]=2.7$ dl./g. was obtained with the polymer yield of 58.5 percent.

EXAMPLE 16

According to the same manner as in example 4, in a glass ampul was placed 0.2 g. of trioxane and irradiated with γ-ray of the dosage of $1.0\times10^6$ rad. The ampul was then connected to a reactor tube containing 2.0 g. of an equimolar mixture of trioxane and tetraoxane while forming gas communication between them. After maintaining the tube at 50° C. for 24 hours, polyoxymethylene having the intrinsic viscosity $[\eta]=1.8$ dl./g. was obtained with the polymer yield of 77.8 percent.

EXAMPLE 17

0.1 g. of granular trioxane purified by distillation was irradiated with electron beams at the dosage of $1.0\times10^6$ under a room temperature, and taken into a reactor tube containing 2.0 g. of granular tetraoxane. The tube was then sealed by fusing and the content mixed only mechanically. This mixture was placed for polymerization, to have the polymer yield of 58.3 percent and the intrinsic viscosity of $[\eta]=1.6$ dl./g.

What is claimed is:

1. A process for the production of polyoxymethylene which comprises first irradiating a cyclic oxymethylene monomer selected from the group consisting of trioxane, tetraoxane and mixtures thereof, with ionizing radiation with a dose greater than $1.0\times10^3$ rads, contacting the irradiated cyclic oxymethylene monomer with a nonirradiated cyclic oxymethylene monomer to form a mixture, then heating said mixture at polymerization temperature of said cyclic oxymethylene monomer to effect polymerization.

2. A process according to claim 1 in which said contacting is by mechanical mixing.

3. A process of claim 1 in which the irradiated cyclic oxymethylene monomer is sublimed and condensed onto the surface of the nonirradiated cyclic oxymethylene monomer.

4. A process of claim 1 in which a vessel containing the irradiated cyclic oxymethylene monomer is connected with another vessel containing nonirradiated cyclic oxymethylene monomer, and contacting both monomers in gaseous phase.

5. A process according to claim 1 which comprises irradiating trioxane with a dose of ionizing radiation greater than $1.0\times10^3$ rad, then contacting the irradiated trioxane with nonirradiated trioxane to form a mixture, and then heating said mixture to a temperature of from 35° C. to just below the melting point of trioxane to effect polymerization.

6. A process according to claim 1 which comprises irradiating tetraoxane with a dose of ionizing radiation greater than $1.0\times10^3$ rad, then contacting the irradiated tetraoxane with nonirradiated tetraoxane to form a mixture, and then heating said mixture to a temperature of from 70° C. to just below the melting point of tetraoxane to effect polymerization.

7. A process for the production of polyoxymethylene which comprises irradiating trioxane with a dose of ionizing radiation greater than $1.0\times10^3$ rads, then contacting the irradiated trioxane with nonirradiated tetraoxane, and then effecting polymerization.

8. A process for the production of polyoxymethylene which comprises irradiating tetraoxane with a dose of ionizing radiation greater than $1.0\times10^3$ rads, then contacting the irradiated tetraoxane with nonirradiated trioxane, and then effecting polymerization.

9. A process for the production of polyoxymethylene which comprises irradiating a mixture of trioxane and tetraoxane with a dose of ionizing radiation greater than $1.0\times10^3$ rads, then contacting the irradiated mixture with nonirradiated trioxane or tetraoxane, and then effecting polymerization.

10. A process for the production of polyoxymethylene which comprises irradiating trioxane or tetraoxane with a dose of ionizing radiation greater than $1.0\times10^3$ rads, then contacting the irradiated trioxane or tetraoxane with nonirradiated mixture of trioxane and tetraoxane, and then effecting polymerization.

* * * * *